United States Patent [19]

Barrett

[11] Patent Number: 5,024,065

[45] Date of Patent: Jun. 18, 1991

[54] AIR CONDITIONING SYSTEM FOR CONFINED SPACES

[76] Inventor: David D. Barrett, P.O. Box 9516, Pompano Beach, Fla. 33075

[21] Appl. No.: 839,221

[22] Filed: Mar. 13, 1986

[51] Int. Cl.⁵ .............................................. F25D 3/02
[52] U.S. Cl. ...................................... 62/285; 62/337; 62/464
[58] Field of Search ................. 62/185, 459, 464, 285, 62/244, 245

[56] References Cited

U.S. PATENT DOCUMENTS

| | | | |
|---|---|---|---|
| 547,995 | 10/1895 | Iliowizi | 62/459 X |
| 920,557 | 5/1909 | Fleming | 62/185 |
| 1,617,050 | 2/1927 | Hamilton | 62/434 X |
| 1,954,455 | 4/1934 | Morse et al. | 62/185 X |
| 2,169,664 | 8/1939 | Shifflett | 62/337 X |
| 2,187,913 | 1/1940 | Quinn | 62/185 |
| 2,432,011 | 12/1947 | Hall | 62/337 |
| 3,888,090 | 6/1975 | Meyer | 62/426 |
| 3,961,496 | 6/1976 | Ku | 62/244 |

Primary Examiner—William E. Wayner
Attorney, Agent, or Firm—Malin, Haley, McHale, DiMaggio & Crosby

[57] ABSTRACT

This invention is a method and apparatus for air conditioning small and confined spaces, particularly where silence of operations is important, and wherein the method involves drawing air through an ice containing chamber and passing it into the confined space desired to be cooled together with provisions for adequate drainage of melted ice and adjustments for varying the actual temperature produced. It includes specially designed radiating tubes for special effect on the cooling ability.

7 Claims, 4 Drawing Sheets

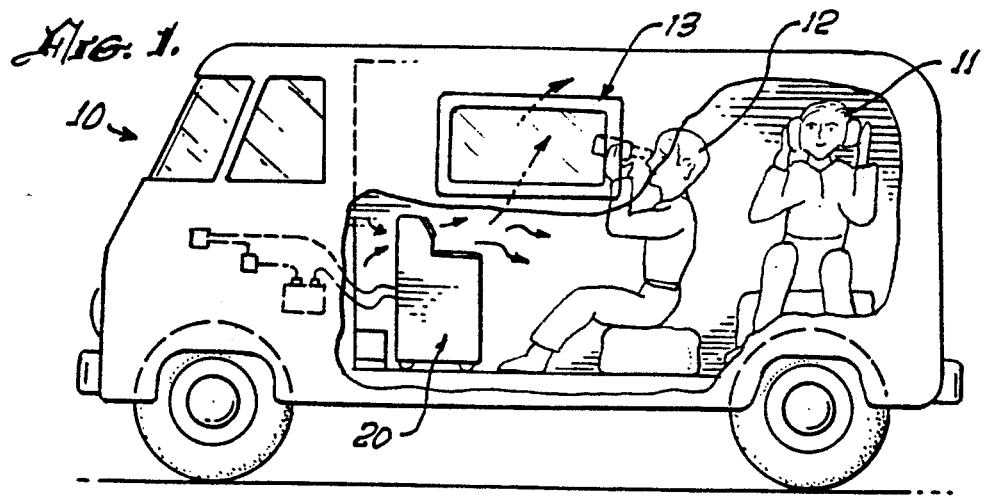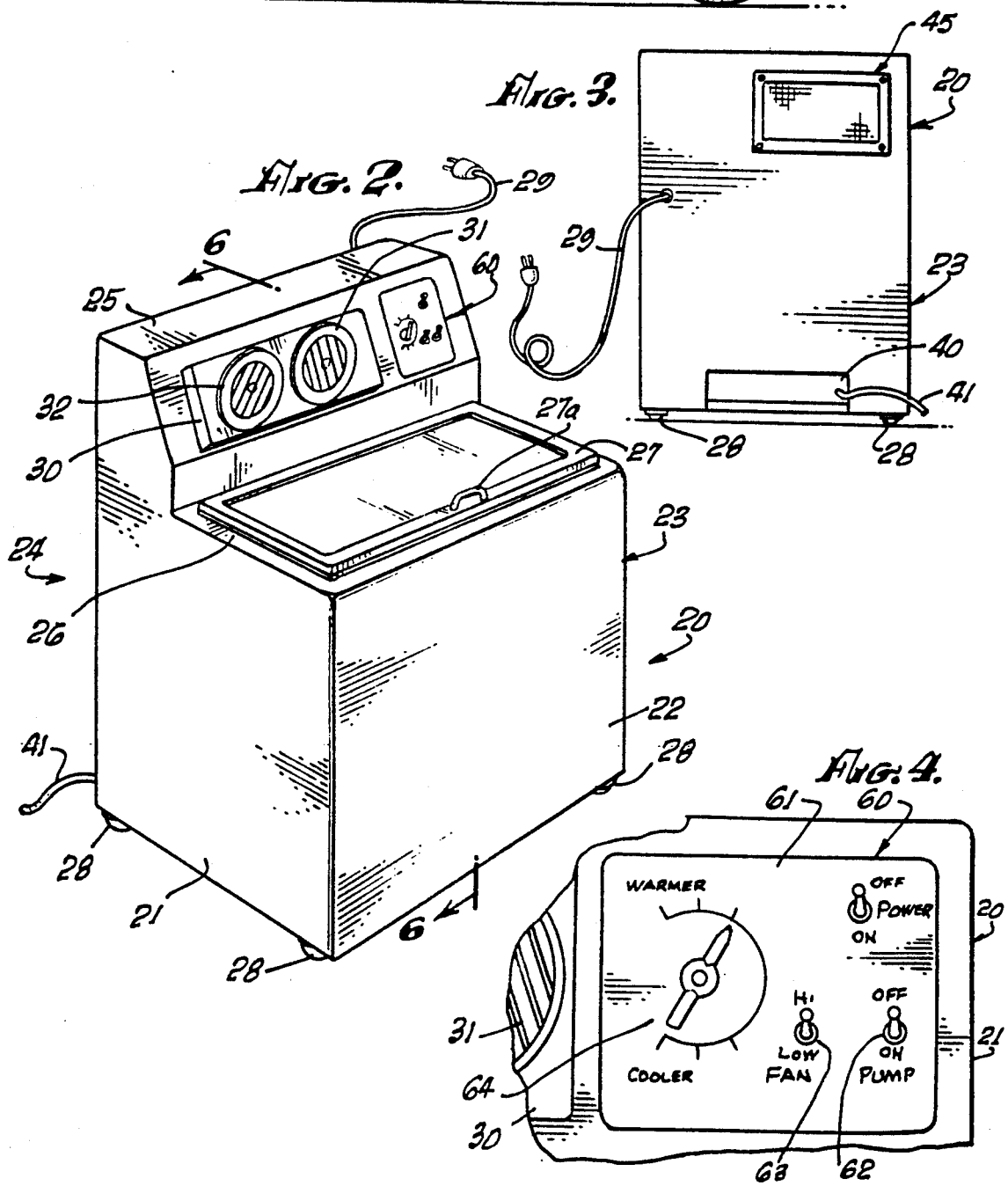

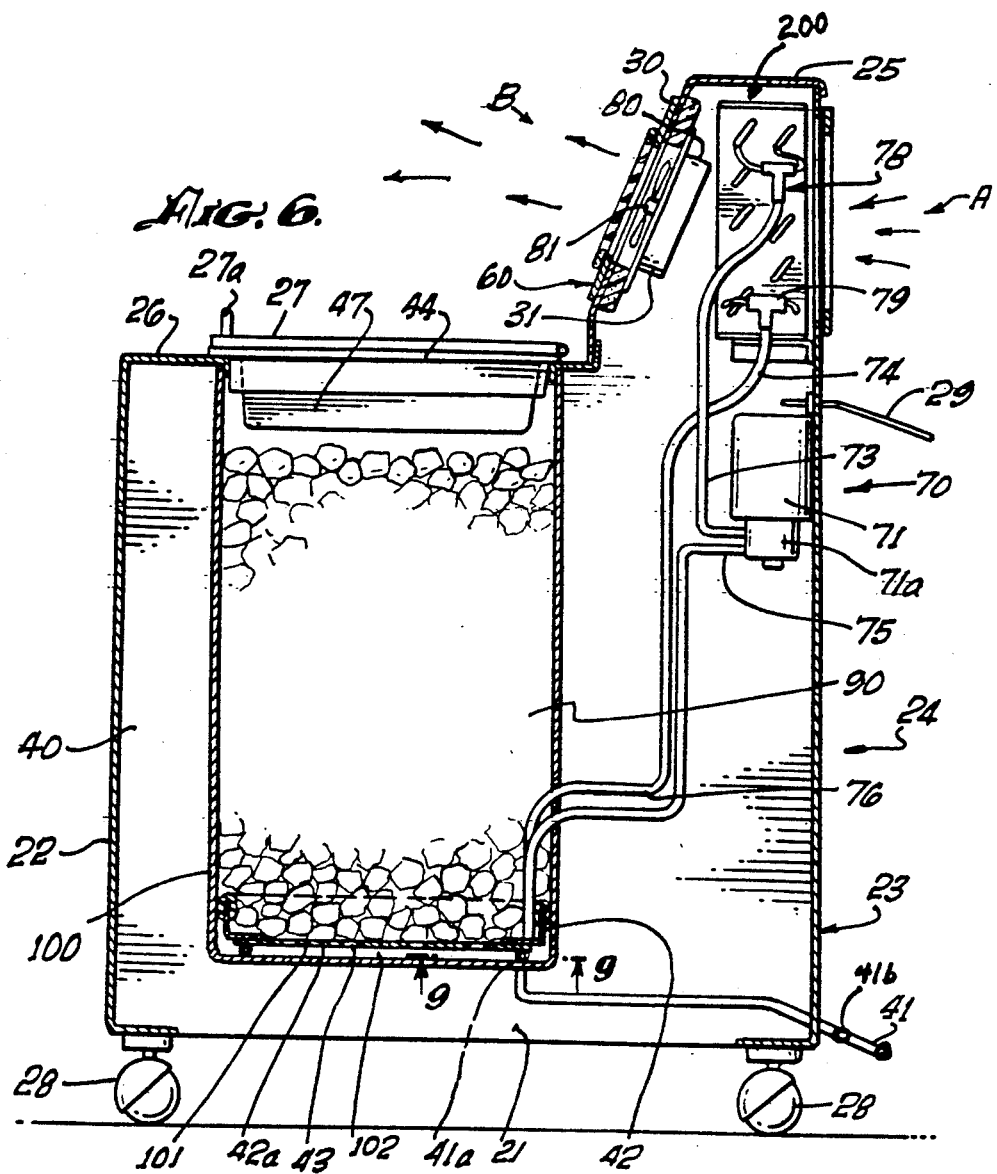
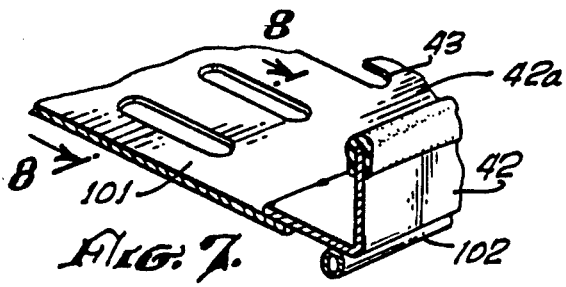
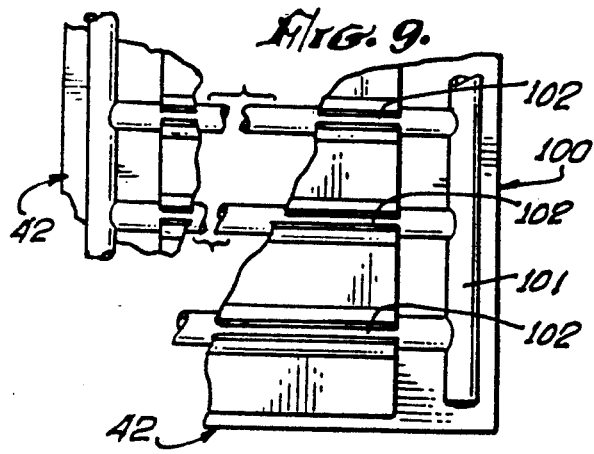
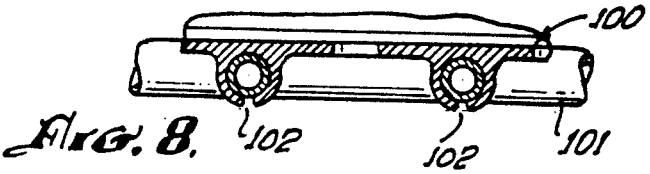

AIR CONDITIONING SYSTEM FOR CONFINED SPACES

CROSS REFERENCE TO RELATED PATENT APPLICATIONS

There are no patent applications related to this application filed by me.

BACKGROUND OF THE INVENTION

I. Field of the Invention

This invention is in the general field of air conditioning type apparatus and is more particularly directed to a silent air conditioning apparatus to be used in confined spaces, particularly in surveillance vehicles and the like; and is even more particularly directed to such an apparatus as will operate with a minimum energy requirement and particularly of a nature which will not interfere with electronic surveillance or the like; and it is even more particularly directed to such an apparatus wherein the medium for cooling is ice contained in an appropriate air circulating apparatus.

II. Description of the Prior Art

There are many air conditioners of one type of another on the market, and there have been various attempts made to utilize exposed ice or cold water circulating through tubes and the like for attempting to control temperatures. While some of these devices may be aimed at solving the problems which the present invention solves, none of them are considered to be real prior art as opposed to, and affecting, the present invention, since I know of no utilization of a cabinet containing the features of the apparatus disclosed in the specifications nor the method of circulating cooled air as in this invention.

SUMMARY OF THE INVENTION

In police, and other proper surveillance operations which are frequently engaged in to apprehend persons engaged in criminal activities, or the like, it is common to use surveillance vehicles, generally small, unobtrusive vans or the like which are closed in such manner that there will be no suspicion on the part of anyone seeing such a vehicle that it is being used for surveillance.

The persons performing the surveillance will be engaged in some visual and some electronic surveillance activity.

It is, or course, necessary to eliminate any suspicion being directed to the vehicle therefore such vehicles are generally parked without any open windows, with the occupants out of sight from the exterior, and no noise emenating from them.

One of the big difficulties with the surveillance as described above is that, particularly in warmer climates, the vehicle can become so warm as to be uncomfortable to the point where surveillance may sometimes have to be discontinued, or steps taken which may arouse the suspicion of someone seeing the vehicle.

Many persons have worked on this problem and, in general, the endeavors are directed toward small conventional air conditioners or the like. These have the obvious disadvantages since the air conditioner must have an exterior opening of some type into which the warm air generated by the air conditioning can be discharged. Such devices frequently interfere with electronic surveillance equipment.

On studying the situation, I have made repeated tests and observations utilizing cold packs of one kind and another including ordinary ice, among other things. While a large tub filled with ice will be of some comfort to someone very close to it, it does not effectively condition the entire interior of a surveillance vehicle or other small confined place.

After much experimentation and development, I have now finally conceived and developed a properly working unit, which I have tested and adjusted over a long period of time to make it totally effective for the purposes desired under actual field conditions.

The method and device as now constructed utilize the principle of drawing air through and over ice and ice cooled ducts and piping and directing such cooled air through directional vents to the areas desired to be cooled. By the special construction of the chamber and cabinet which enclose the ice and the compartment through which the air is drawn, I have been able to achieve a remarkable degree of control and of maximum cooling by the use of very simple electrical-low drain fans which do not interfere with the electronic requirements of the surveillance vehicle and the like.

Likewise, I have been able to even provide for a small food storage section within the ice compartment so that surveillance personnel on long missions may maintain food in a cool condition such that it will not spoil. Frequently this is necessary on a lengthly surveillance and the inability to have proper control of food supplies has caused failure of some surveillance missions.

I have also incorporated means to control the actual cooling effect so that under certain circumstances, such as approaching night, and the like, the vehicle or other confined space will not become unduly cool.

It is an object of this invention to provide a means for cooling the interior of a small confined space without the use of conventional air conditioning units;

Another object of this invention is to provide such a unit as described, which also has the capability of storing a limited amount of foods;

Another object of this invention is to provide a method and apparatus as heretofore described wherein there will not be undue interference with electronic surveillance equipment.

The foregoing and other objects and advantages of this invention will become apparent to those skilled in the art upon reading the description of a preferred embodiment which follows in conjunction with a review of the appended drawings.

BRIEF DESCRIPTION OF THE DRAWINGS

FIG. 1 is a schematic partially broken away side elevation of a surveillance vehicle using the method and apparatus of this invention for cooling;

FIG. 2 is a perspective of a preferred embodiment of a cabinet for the apparatus to perform the method of this invention;

FIG. 3 is a rear elevation of the apparatus of FIG. 2 but in reduced scale;

FIG. 4 is an enlarged, partially broken away view of the control area 60 as shown on FIG. 2;

FIG. 6 is a schematic, partially sectioned, partially broken away and somewhat enlarged view on 6—6 of FIG. 2;

FIG. 7 is a partially broken away view of the base element upon which the ice rests within the unit;

FIG. 8 is a section, partially broken away, on 8—8 of FIG. 7;

FIG. 9 is a partially broken away schematic partial view of a portion of the ice container chamber 100.

DESCRIPTION OF A PREFERRED EMBODIMENT

FIG. 1 shows a van generally 10 of customary van construction having limited window space 13 and in which surveillance operatives 11 and 12 are working. A preferred embodiment of the apparatus to practice the method of this invention is illustrated at 20.

Figure 5:
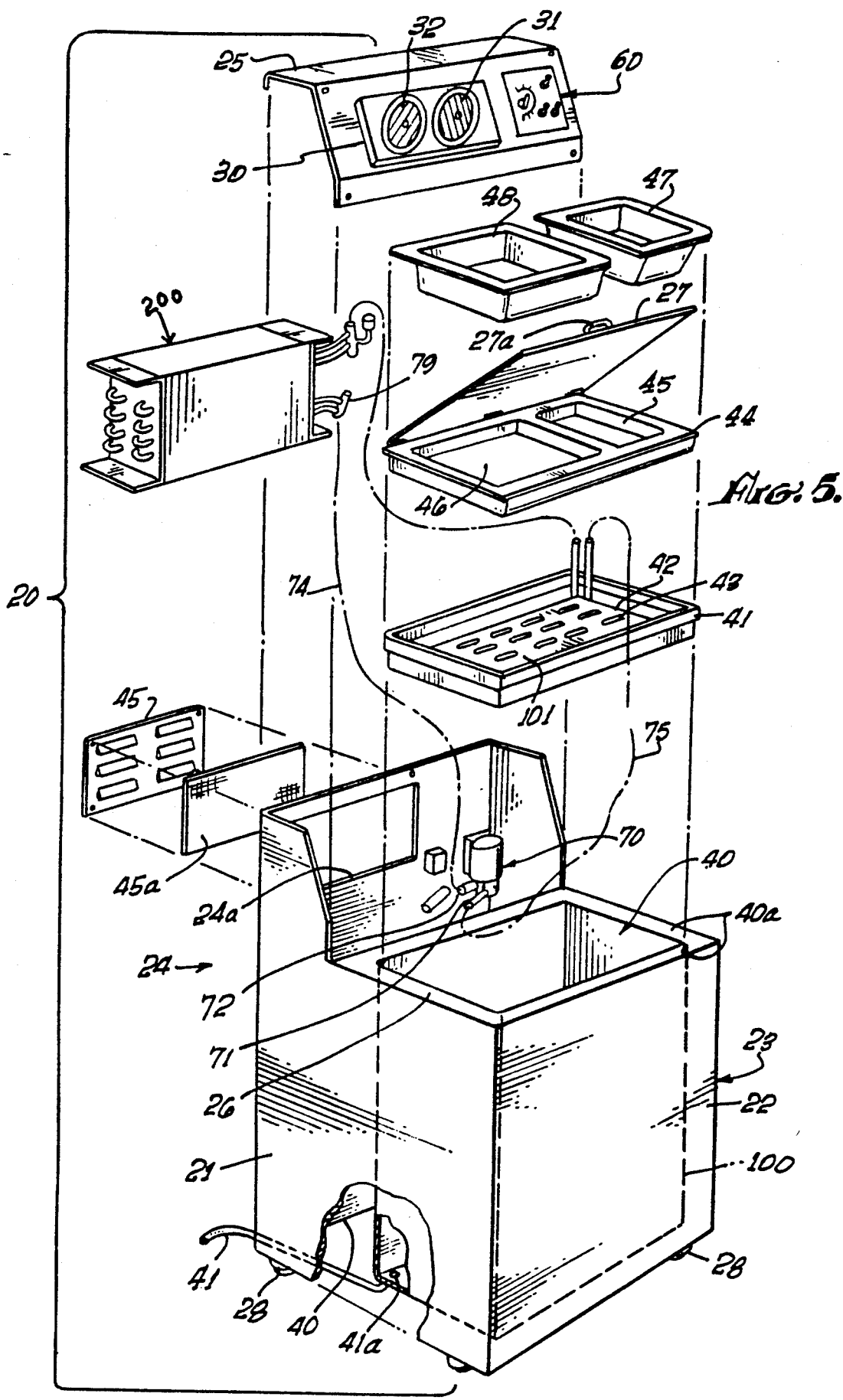
FIG. 5 is an exploded view of the cabinet as shown in FIG. 2 showing the elements thereof.
Figure 10:
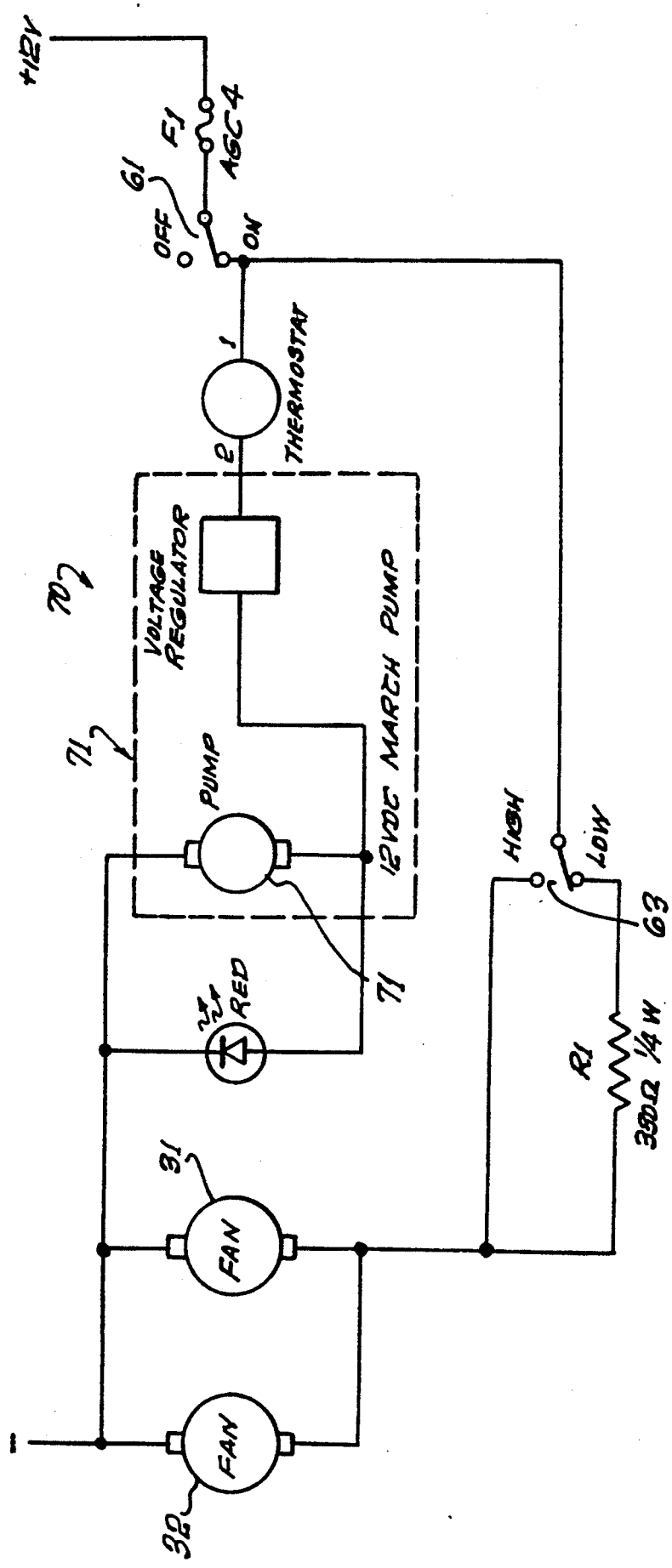
FIG. 10 is a schematic diagram of the electrically operating elements of the apparatus.

Examining FIGS. 2, 3, 4, and 5 in conjunction with one another it is noted that this device comprises a cabinet generally 20 having side walls and front and back walls 21, 22, 23, and 24 in the general configuration as shown. The top of the ice chamber 26 has an opening 40 with an extending portion 40a about the opening. The opening 40 has a lid arrangement 27 with a handle 27a, which lid arrangement has a hinged portion and is hinged to an area 44 having depth in which food trays 45 and 46 may be placed. The upper top of the upper portion of the cabinet is covered by an element 25 which is configured as is particularly shown in FIG. 5 so as to provide for air outlet panel 30 containing a pair of air outlets 31 and 32, which are adjustable, as well as a control panel 60. An opening 24a is provided in the rear segment 24 and that opening is provided with a vented closure 45 which allows air to pass through it and through the screen 45a so as to be directed by a pair of low drain fans as indicated at 80 and 81 in FIG. 6. Only one of the fans 80 with its motor 80 is shown although there will be two such units preferably. A coil unit 200 will be between the fan and its louvered directional elements 31 and 32. This coil unit is connected as shown at 78 and 79 through appropriate conduits 73, 74, 75, and 76 to the piping 101 and 102 in the floor of the lower pan 101 and the walls 100 of the ice chamber. A drain pipe 41 is provided to allow for drainage of water which may accumulate from time to time in the space between the ice pan 101 and the lower portion of the chamber 100. Panels 42 with floor 42a and openings 43 allow for this water to be dissipated in this manner.

The ice chamber 90 is normally filled with ice at the beginning of an operation and the ice may be replenished as desired.

The unit may preferably be mounted on ball casters 28 or the like so it can be moved as desired with ease.

The pump and regulator unit 70 is contained in a housing generally 71. The pump is normally operated by 12 volts DC current operating from the vehicle's 12 volt battery as indicated in the schematic drawing. A thermostat is provided as indicated in schematic diagram and this thermostat control is at 64 wherein operation can be controlled in the overall operational panel 61 including a fan switch which can switch from low to high as well as a pump switch which can be turned on or off as desired. When the pump switch is on, the pump is activated and circulates, through the piping as indicated at 73, 75, and the pump 71a so as to circulate through the radiator unit 200 in order that air may be drawn as at A through the back grill and filter and pass forward through the fan units 81 and the control baffles 31 and 32. An appropriate fuse at F1 (AGC4) will be provided to protect the circuits. The resistor circuit running from high to low on the fans will be understood by those skilled in the art as well as the pump protective circuit.

In operation, the chamber 40 will be filled with ice 90 which will preferably be in chunk or crushed form. It gives a more effective cooling, in general, than a large cake of ice and keeps the chamber very cold. The chamber is kept cold and thus the food containing units are also kept cold at all times. However the effect of the cooling is isolated and insulated from the occupants so that they will not get too cold by reason of the ability of control of the pump and fans. When the pump is not operating, there will be no cold air passing through the radiator unit 200.

The drain 41 will be connected to an opening 41a and may be drained into a container, through an opening in the floor of the vehicle, or it may not be operated at all at certain times if desired by clamping it off by an ordinary hose clamp as will be known to those skilled in the art or by insertion of a valve in the line as indicated at 41b.

While the embodiment of this invention shown and described is fully capable of achieving the objects and advantages desired, it is to be understood that this embodiment is for purposes of illustration only and not for purposes of limitation.

I claim:

1. An apparatus for cooling a confined space such as within a closed surveillance vehicle which does not betray the cooling operation within the vehicle through noise, electronic emission or liquid dripping comprising:
   a cabinet having a front wall, a pair of side walls and a rear wall;
   an ice and water containing chamber within said cabinet insulated from said cabinet walls;
   a pan including heat conducting material having a multiplicity of fluid conduits, said pan mounted in the adjacent floor area of said chamber, said fluid conduits disposed within said ice and water containing chamber so that said fluid conduits are substantially surrounded by ice and water within said ice containing chamber thereby efficiently cooling said fluid conduits in said pan and cooling fluid within said fluid conduits;
   an intake conduit and an outlet conduit connected to said pan fluid conduits;
   a pump for circulating a fluid connected to said outlet conduit;
   a heat exchanging radiator unit connected to said inlet conduit;
   second fluid conduit connected to said pump and said radiator;
   means to draw air through said radiator unit and pass it into the confined space within said surveillance vehicle;
   said cabinet including a radiator housing means, said radiator being mounted within said radiator housing means;
   means for storing food within said ice and water chamber;
   means for controlling operation of said pump;
   means for controlling the operation of said air drawing means connected to said air drawing means.

2. An apparatus for cooling a confined space as in claim 1, including:
   means for selectively draining said ice and water chamber.

3. An apparatus for cooling a confined space comprising:

a cabinet having a vented, screened closure located in the rear of said cabinet, whereby air from outside said cabinet may pass into said cabinet;

an ice and water chamber, located within said cabinet, adapted to sealingly contain ice and water;

a removeable cover attached to the top of said ice and water chamber;

air outlet panel located near the top of said cabinet having at least one air outlet, said air outlet having means for adjustably directing air passing through said air outlet;

at least one low drain electrical fan connected to a source of electrical power, said fan attached to said air outlet panel and directed to move air from inside said cabinet through said air outlet to the outside of said cabinet;

a radiator coil unit, having a fluid input and output, said radiator coil unit located between said fans and said air outlets;

a lower pan located within said ice and water chamber, containing a plurality of conduits, said conduits connected to a common conduit input and a common conduit output, said conduits exposed on their outside surfaces to the interior of said ice and water chamber, said conduits manufactured of a heat conducting material;

a first piping means connecting said output of said coil unit and said conduit input;

a second piping means connecting said input of said coil unit and said conduit output;

a pump, intermediate said second piping means, for moving fluid through said second piping means, said coil unit, said first piping means, and said conduits within said lower pan;

whereby a confined space is cooled, little energy is consumed by the apparatus while operating, and indicia of the presence or operation of said apparatus in the form of water outside of said apparatus, resulting from ice melting said ice chamber, is eliminated.

4. The device of claim 3, including:

a drain pipe connected to said ice and water chamber whereby water in said ice and water chamber from ice melted in said ice and water chamber may flow out of said ice and water chamber;

means for stopping the flow of water from said ice chamber out of said drain pipe.

5. The device of claim 3 further comprising means for controlling the operation of said pump.

6. The device of claim 3 further comprising means for controlling the operation of said fan.

7. The device of claim 3 further comprising means within said ice and water chamber, for storing food.

* * * * *